United States Patent [19]
Ju et al.

[11] Patent Number: 6,034,797
[45] Date of Patent: Mar. 7, 2000

[54] PRISM-TYPE OBJECTIVE LENS FOR THE PICKUP HEAD OF AN OPTICAL DISC DRIVE CAPABLE OF DRIVING TWO TYPES OF OPTICAL DISCS

[75] Inventors: Jau-Jiu Ju, Hsinchu Hsien; Eric G. Lean; Der-Ray Huang, both of Hsinchu, all of Taiwan

[73] Assignee: Industrial Technology Research Institute, Hsinchu, Taiwan

[21] Appl. No.: 09/096,315

[22] Filed: Jun. 11, 1998

[30] Foreign Application Priority Data

Feb. 19, 1998 [TW] Taiwan ................................ 87102316

[51] Int. Cl.⁷ ............................ G02B 5/32; G02B 5/04; G11B 7/00

[52] U.S. Cl. ........................... 359/15; 359/833; 359/645; 369/112; 369/44.37

[58] Field of Search ............................ 359/15, 833, 831, 359/836, 438, 645; 369/44.37, 112, 113

[56] References Cited

U.S. PATENT DOCUMENTS 5,206,675  4/1993  Miyauchi et al. ....................... 359/833

FOREIGN PATENT DOCUMENTS

404134303  5/1992  Japan ........................................ 359/15

Primary Examiner—Cassandra Spyrou
Assistant Examiner—Fayez Assaf
Attorney, Agent, or Firm—Thomas, Kayden, Horstemeyer & Risley

[57] ABSTRACT

A prism-type objective lens is provided for use in the pickup head of an optical disc drive capable of driving two types of optical discs such as a CD and a DVD. The prism-type objective lens allows the pickup head to be made more compact in size with reduced structural complexity, and also allows the pickup head to read data from two different types of optical discs. The prism-type objective lens includes a prism having a cross section substantially in the shape of a right triangle, a front aspherical plano-convex lens, and a rear aspherical plano-convex lens, where the planar surface of each lens is attached to one or the other of the leg sides of the prism. The hypotenuse side of the prism can be formed with two aperture areas where different reflective layers are coated. Alternatively, the hypotenuse side of the prism can be formed with a reflective HOE layer that allows the laser beam incident on it and reflected from it to be diffracted into two beams which are focused at different points. Either manner allows the pickup head to read data from two different types of optical discs.

15 Claims, 9 Drawing Sheets

PRISM-TYPE OBJECTIVE LENS FOR THE PICKUP HEAD OF AN OPTICAL DISC DRIVE CAPABLE OF DRIVING TWO TYPES OF OPTICAL DISCS

CROSS-REFERENCE TO RELATED APPLICATION

This application claims the priority benefit of Taiwan application Ser. No. 87102316, filed Feb. 19, 1998, the full disclosure of which is incorporated herein by reference.

BACKGROUND OF THE INVENTION

1. Field of the Invention

This invention relates to optical disc drives, and more particularly, to a prism-type objective lens for use in the pickup head of an optical disc drive capable of driving at least two types of optical discs such as a CD (compact disc) and a DVD (digital video disc). The prism-type objective lens is structured in such a manner that allows the pickup head to be made more compact in size with reduced structural complexity.

2. Description of Related Art

In the multimedia age, an optical disc drive is an indispensable device on a personal computer system. Conventional optical disc drives are designed to read data from a low-density optical disc, often referred to as a CD (compact disc). However, with advances in optical technology, a new type of high-density optical disc, called a DVD (digital video disc) is able to hold much more data than the conventional CD can hold. New types of optical disc drives are usually designed to be capable of reading data from both types of optical discs. With notebook computers getting more popular, a DVD/CD optical disc drive should be made compact enough so that it can be used as a standard built-in device in a notebook computer. Presently, there is one type of pickup head which is only 6.7 mm (millimeter) in height; however, it is still considered too thick to be used as a DVD/CD drive for installation on a notebook computer. Conventional optical disc drives are quite complex in structure due to the fact that each single optical component can only provide one single optical function; for example, a folding mirror is used solely for reflecting the light incident on it to other directions, and a collimator is solely used to collimate the light passing through it. As a result, the total number of the optical components constituting the pickup head is large, thus increasing the structural complexity of the optical system of the pickup head. Several conventional optical disc drives that are too bulky in size due to the use of too many optical components are illustratively depicted in the following.

Figure 1A:
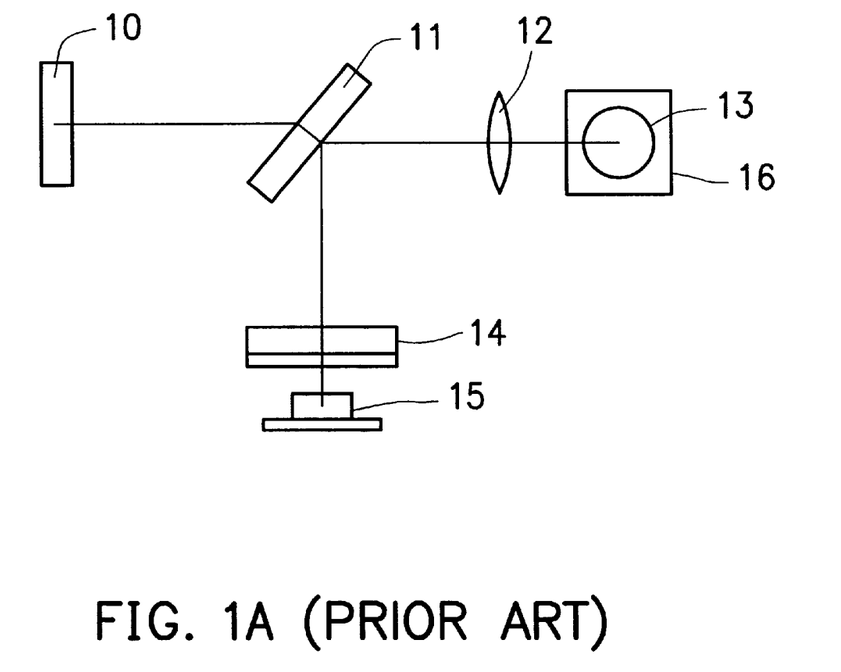
FIG. 1A is a schematic top view of a DVD pickup head that is manufactured by the SANYO Corporation.
Figure 1B:
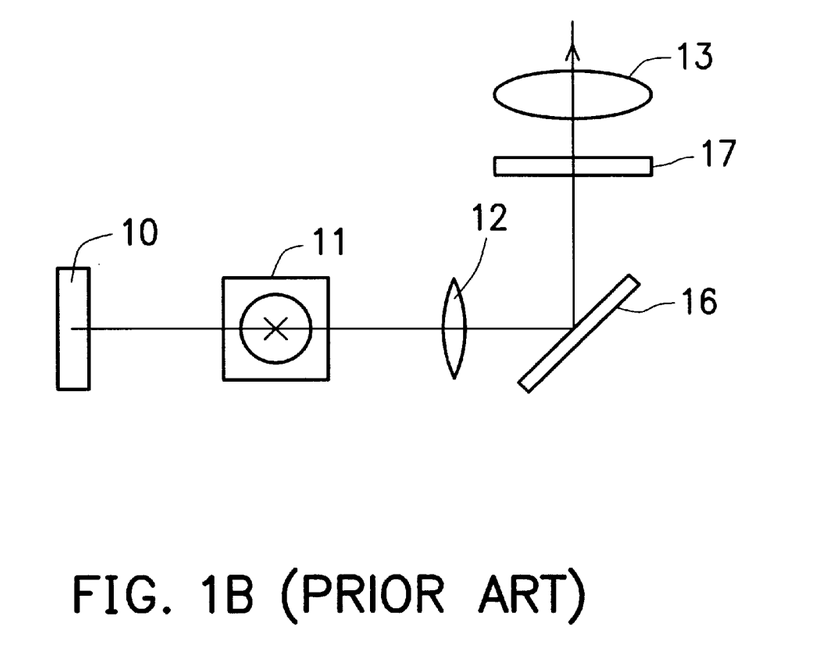
FIG. 1B is a schematic side view of the DVD pickup head of FIG. 1A.

FIGS. 1A–1B are schematic top and side views of a conventional DVD pickup head that is manufactured by the SANYO Corporation. As shown, this DVD pickup head includes, which is of the type using a liquid crystal (LC) shutter to set the desired numerical aperture (NA). As shown, this DVD pickup head includes a laser diode 15, a grating 14, a photo-detector pre-amp IC 10, a board splitter 11, a collimator 12, an objective lens 13, a folding mirror 16, and a polarizer 17 (FIG. 1B). In operation, the laser diode 15 generates a laser beam, which then passes through the grating 14 to the board splitter 11. At the board splitter 11, part of the laser beam is reflected to the collimator 12 and collimated by the same. The collimated light from the collimator 12 is then reflected by the folding mirror 16 to the polarizer 17. The output light from the polarizer 17 is then focused by the objective lens 13 onto the information surface of the optical disc (not shown) being read. The reflected light from the optical disc (not shown) then propagates in the reverse direction through the polarizer 17, the folding mirror 16, and the collimator 12 to the board splitter 11. At the board splitter 11, part of the reflected light transmits straight through the board splitter 11 to the photo-detector pre-amp IC 10. In response to the reflected light, the photo-detector pre-amp IC 10 generates a number of opto-electrical signals that can be processed in a conventional method to obtain the data stored on the optical disc.

Figure 2A:
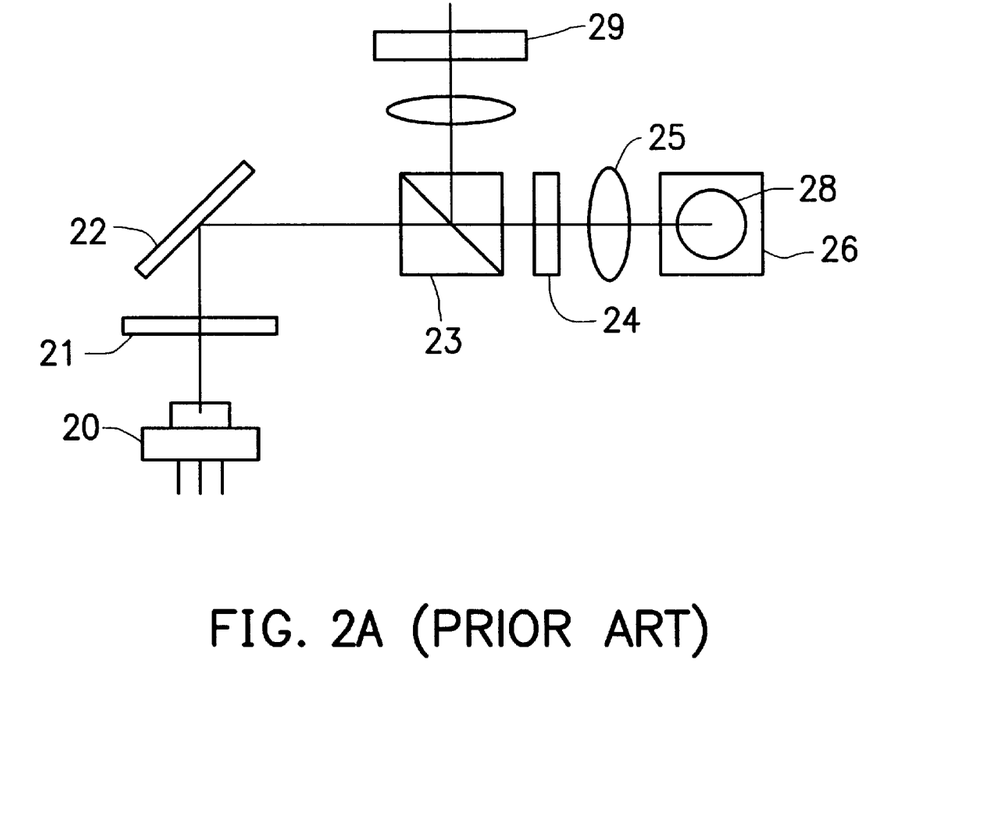
FIG. 2A is a schematic top view of a DVD pickup head that is manufactured by the PIONEER Corporation.
Figure 2B:
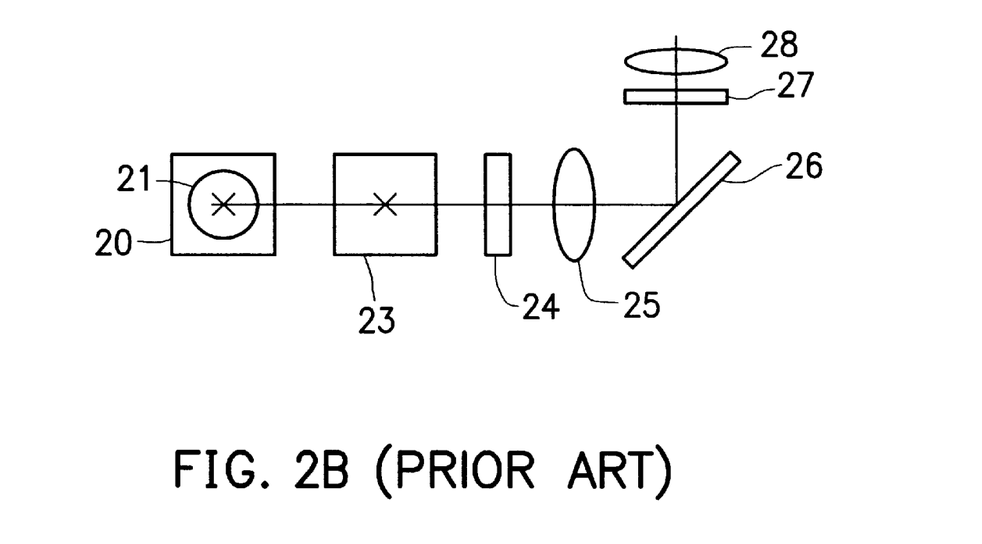
FIG. 2B is a schematic side view of the DVD pickup head of FIG. 2A.

FIGS. 2A–2B are schematic top and side views of a conventional DVD pickup head that is manufactured by the PIONEER Corporation. As shown, this DVD pickup head includes a laser diode 20, a grating 21, a first folding mirror 22, a board splitter 23, a quarter-wave plate 24, a collimator 25, a second folding mirror 26, a holographic optical element (HOE) 27, an objective lens 28, and a photo-detector pre-amp IC 29. The laser diode 20 is capable of generating a laser beam of 650 nm (nanometer) in wavelength. The laser beam from the laser diode 20 first passes through the grating 21 to the first folding mirror 22 where the laser beam is reflected to the board splitter 23. At the board splitter 23, part of the laser beam propagates straight through the board splitter 23 to the quarter-wave plate 24. The output light from the quarter-wave plate 24 is then collimated by the collimator 25 and then reflected by the second folding mirror 26 to the HOE 27. The output light from the HOE 27 is then focused by the objective lens 28 onto the information surface of the optical disc (not shown) being read. This DVD pickup head can be selectively set to read either a CD or a DVD. The reflected light from the optical disc (not shown) then propagates in the reverse direction through the HOE 27, the second folding mirror 26, the collimator 25, and the quarter-wave plate 24 to the board splitter 23. At the board splitter 23, part of the reflected light from the optical disc is reflected sideways to the photo-detector pre-amp IC 29. In response to the reflected light, the photo-detector pre-amp IC 29 generates a number of opto-electrical signals that can be processed in a conventional method to obtain the data stored on the optical disc.

Figure 3A:
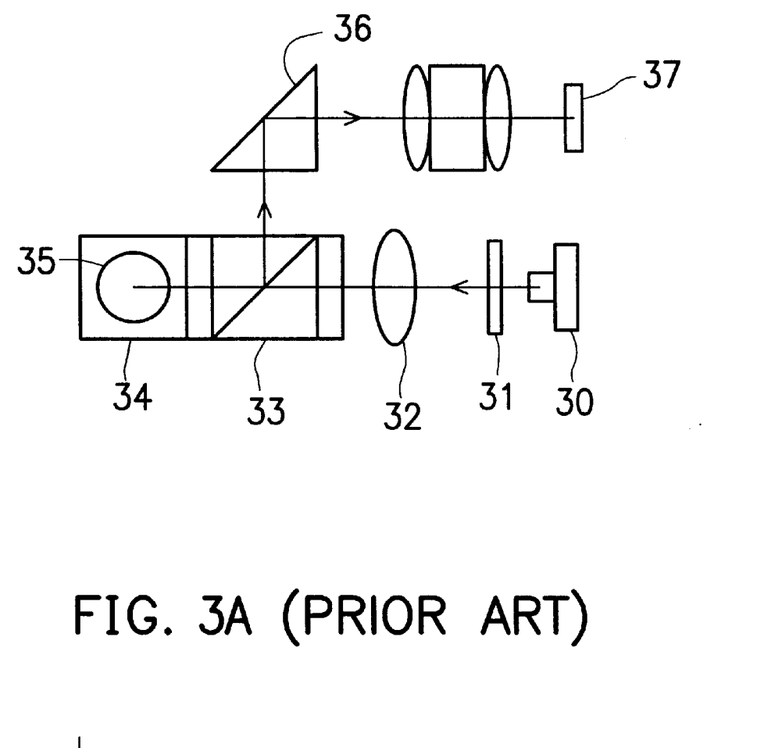
FIG. 3A is a schematic top view of a DVD pickup head that is manufactured by the PANASONIC Corporation.
Figure 3B:
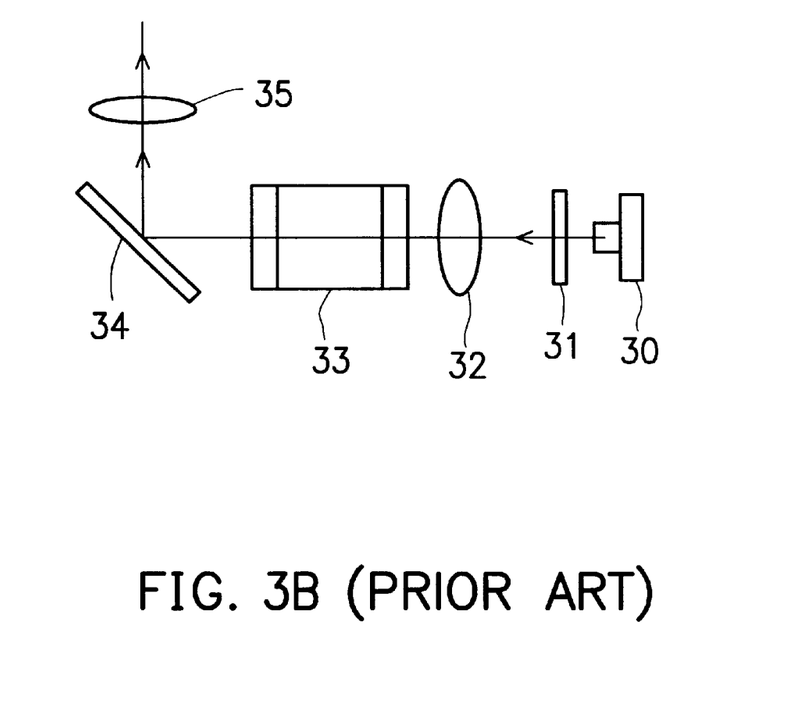
FIG. 3B is a schematic side view of the DVD pickup head of FIG. 3A.

FIGS. 3A–3B are schematic top and side views of a conventional DVD pickup head that is manufactured by the PANASONIC Corporation. As shown, this DVD pickup head includes a laser diode 30, a grating 31, a collimator 32, a board splitter 33, a first folding mirror 34, an objective lens 35 having a built-in HOE, a second folding mirror 36, and a photo-detector pre-amp IC 37. In operation, the laser diode 30 generates a laser beam which then passes through the grating 31 and the collimator 32 to the board splitter 33. At the board splitter 33, part of the laser beam propagates straight through the board splitter 33 to the first folding mirror 34 where the laser beam is reflected to the objective lens 35. The built-in HOE of the objective lens 35 causes a holographic effect on the laser beam, and then the objective lens 35 focuses the laser beam onto the information surface of the optical disc (not shown) being read. This DVD pickup head can be selectively set to read either a CD or a DVD. The reflected light from the optical disc (not shown) then propagates in the reverse direction through the objective lens 35 and subsequently through the first folding mirror 34 to the board splitter 33. At the board splitter 33, part of the reflected light from the optical disc is reflected sideways to the second folding mirror 36 which then reflects the beam to the photo-detector pre-amp IC 37. In response to the reflected light, the photo-detector pre-amp IC 37 generates a number of opto-electrical signals that can be processed in a conventional method to obtain the data stored on the optical disc.

Figure 4A:
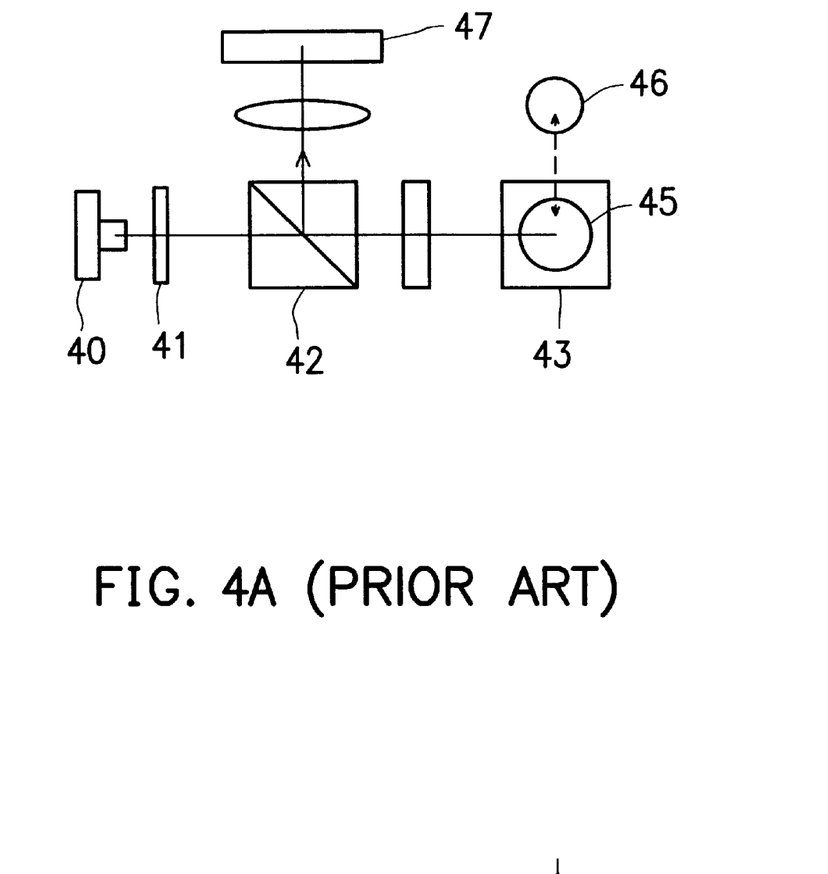
FIG. 4A is a schematic top view of a DVD pickup head that is manufactured by the SANYO Corporation.
Figure 4B:
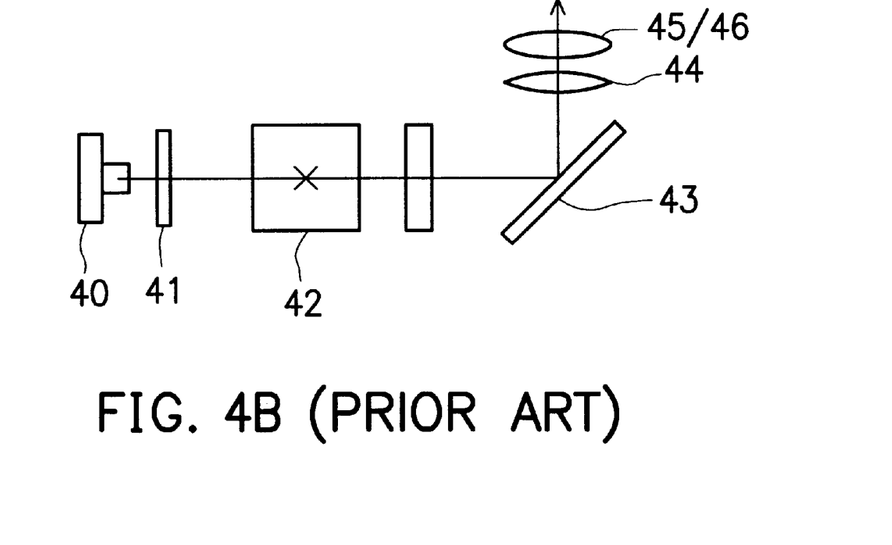
FIG. 4B is a schematic side view of the DVD pickup head of FIG. 4A.

FIGS. 4A–4B are schematic top and side views of a conventional DVD pickup head that is manufactured by the SANYO Corporation. As shown, this DVD pickup head includes a laser diode 40, a grating 41, a board splitter 42, a folding mirror 43, a collimator 44, a lens unit which can be switched between a DVD objective lens 45 and a CD objective lens 46 (in the case of reading a DVD, the DVD objective lens 45 is set in position, while in the case of reading a CD, the CD objective lens 46 is set in position), and a photo-detector pre-amp IC 47. In operation, the laser diode 40 generates a laser beam, which then passes through the grating 41 to the board splitter 42. At the board splitter 42, part of the laser beam transmits straight through the board splitter 42 to the folding mirror 43 where the laser beam is reflected to the collimator 44. Depending on the current type of the optical disc being inserted in the optical disc drive, either the DVD objective lens 45 or the CD objective lens 46 is set in position in the optical axis of the collimator 44, allowing the output light from the collimator 44 to be focused by the corresponding type of objective lens onto the information surface of the optical disc (not shown). The reflected light from the optical disc (not shown) then propagates in the reverse direction through the objective lens 45 or 46, the collimator 44 and the folding mirror 43 to the board splitter 42. At the board splitter 42, part of the reflected light is reflected sideways to the photo-detector pre-amp IC 47. In response to the reflected light, the photo-detector pre-amp IC 47 generates a number of opto-electrical signals that can be processed in a conventional method to obtain the data stored on the optical disc.

Figure 5A:
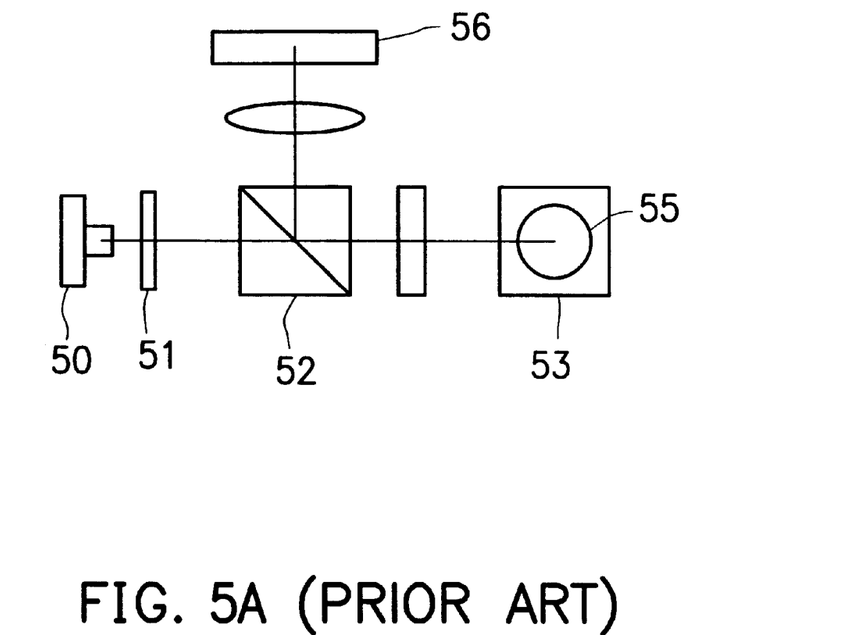
FIG. 5A is a schematic top view of a DVD pickup head that is manufactured by the SAMSUNG Corporation.
Figure 5B:
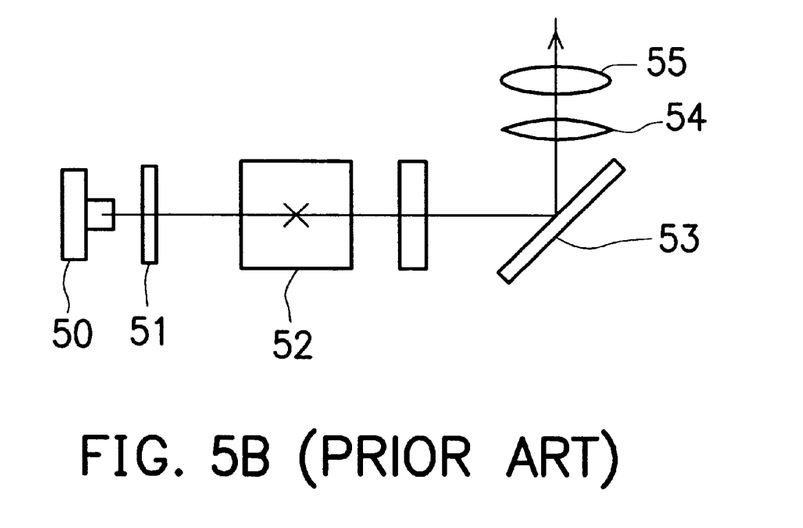
FIG. 5B is a schematic side view of the DVD pickup head of FIG. 5A.

FIGS. 5A–5B are schematic top and side views of a conventional DVD pickup head that is manufactured by the SAMSUNG Corporation. As shown, this DVD pickup head includes a laser diode 50, a grating 51, a board splitter 52, a folding mirror 53, a collimator 54, an objective lens 55, and a photo-detector pre-amp IC 56. The objective lens 55, in particular, is of an annular mask type. In operation, the laser diode 50 generates a laser beam, which then passes through the grating 51 to the board splitter 52. At the board splitter 52, part of the laser beam transmits straight through the board splitter 52 to the folding mirror 53 where the laser beam is reflected to the collimator 54. The collimated light from the collimator 54 is then focused by the objective lens 55 onto the information surface of the optical disc (not shown) being read. This DVD pickup head can be selectively set to read either a CD or a DVD. The reflected light from the optical disc (not shown) then propagates in the reverse direction through the objective lens 55, the collimator 54 and the folding mirror 53 to the board splitter 52. At the board splitter 52, part of the reflected light is reflected sideways to the photo-detector pre-amp IC 56. In response to the reflected light, the photo-detector pre-amp IC 56 generates a number of opto-electrical signals that can be processed in a conventional method to obtain the data stored on the optical disc.

In the foregoing five conventional models of DVD pickup heads, a common design scheme is the use of an objective lens in conjunction with a folding mirror, with the folding mirror being used to reflect the laser beam to the objective lens. One drawback to this design scheme, however, is that it makes the overall pickup head bulky in size since the objective lens and the folding mirror are separate components. Moreover, the use of the board splitters, the polarizers, and the gratings also make the foregoing pickup heads bulky in size and complex in structure. These drawbacks make these conventional pickup heads less compact and therefore unsuitable for use on an optical disc drive that is intended to be installed on a notebook computer.

SUMMARY OF THE INVENTION

It is therefore an objective of the present invention to provide a prism-type objective lens for use in the pickup head of an optical disc drive, which can allow the pickup head to be more compact in size with reduced structural complexity.

It is another objective of the present invention to provide a prism-type objective lens for use in the pickup head of an optical disc drive, which allows the pickup head to read data from two types of optical discs such as a CD and a DVD.

In accordance with the foregoing and other objectives of the present invention, a prism-type objective lens is provided for use in the pickup head of an optical disc drive capable of driving two types of optical discs. The prism-type objective lens of the invention includes a prism having a cross section substantially in the shape of a right triangle; a front aspherical plano-convex lens having a planar side attached to a first side other than the hypotenuse side of the prism; and a rear aspherical planar-convex lens having a planar side attached to a second side other than the hypotenuse side of the prism.

The hypotenuse side of the prism can be formed with an inner-aperture area where an inner reflective layer is coated and an outer-aperture area surrounding the inner-aperture area where an outer reflective layer is coated. In the preferred embodiments, the inner-aperture area is equivalent to NA=0.43, while the outer-aperture area is equivalent to NA=0.6. Furthermore, the inner reflective layer is formed in such a manner as to be capable of reflecting a first laser beam of from 650 nm to 780 nm in wavelength, and the outer reflective layer is formed in such a manner as to be capable of reflecting a second laser beam of 650 nm in wavelength. These provisions allow the prism-type objective lens of the invention to be formed with two apertures of different NA values for the purpose of reading data from two different types of optical discs.

Alternatively, the hypotenuse side of the prism can be formed with a reflective HOE layer that allows the laser beam incident on it and reflected from it to be diffracted into two beams which are focused at different points for the purpose of reading data from two different types of optical discs.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 6A:
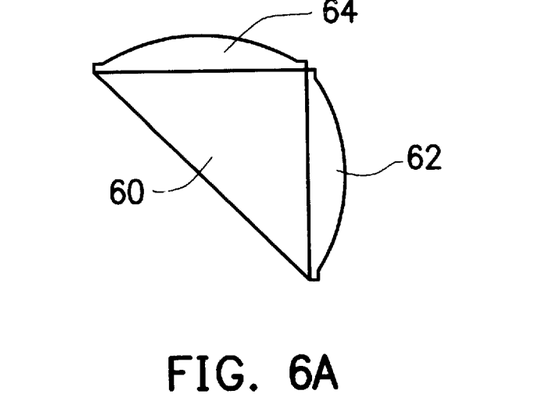
FIG. 6A is a schematic diagram of the prism type objective lens of the invention.

This invention provides a prism type objective lens shown as FIG. 6A, which comprises a prism having a cross section substantially in the shape of a right triangle 60, a front aspherical plano-convex lens 62, and a rear aspherical piano-convex lens 64. This invention also provides two methods to be suited to read CD and DVD.

Figure 6B:
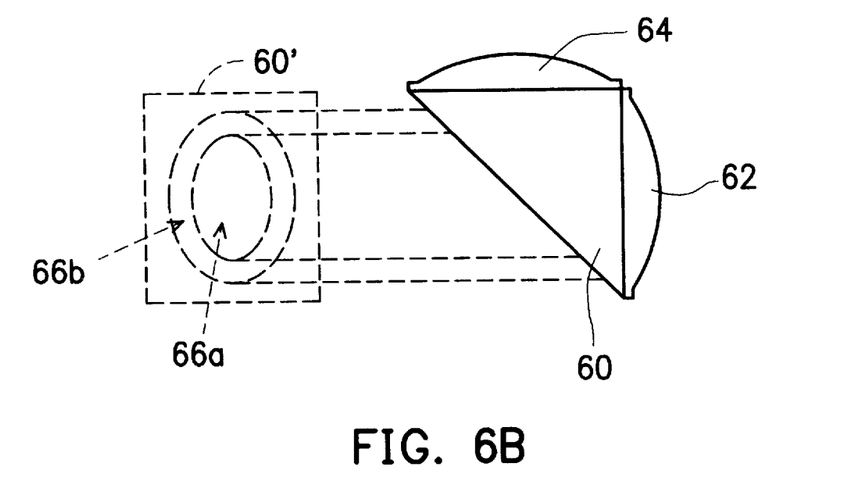
FIG. 6B is a schematic diagram of the prism type objective lens of the invention with two coating layers on the hypotenuse side of the prism.

Referring to FIG. 6B, the hypotenuse side 60' of the prism 60 can be formed with a coated inner-aperture area 66a and a coated outer-aperture area 66b surrounding the coated inner-aperture area 66a. The inner-aperture coated area is equivalent to NA=0.43 to be capable of reflecting a laser beam of from 650 nm to 780 nm in wavelength and the outer-aperture coated area is equivalent to NA=0.6 to be capable of reflecting a laser beam of 650 nm in wavelength, which are focused at two different points for the purpose of reading data from two different types of optical discs.

Figure 6C:
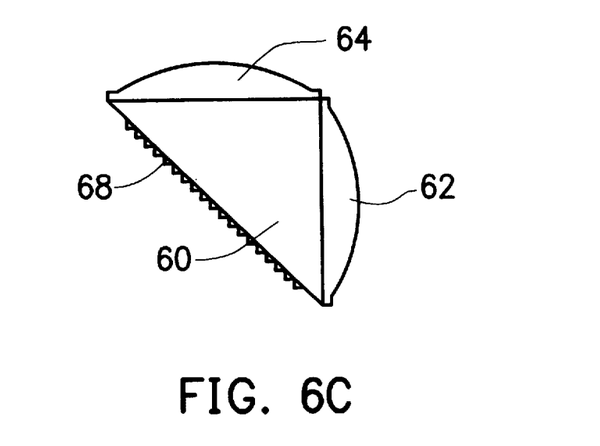
FIG. 6C is a schematic diagram of the prism type objective lens of the invention with a reflective HOE layer on the hypotenuse side of the prism.

Referring to FIG. 6C, the hypotenuse side 60' of the prism 60 can be formed with a reflective HOE layer 68 that allows the laser beam incident on it and reflected from it to be diffracted into two beams which are focused at two different points for the purpose of reading data from two different types of optical discs.

First Example of A Pickup Head Utilizing the Invention

Figure 7:
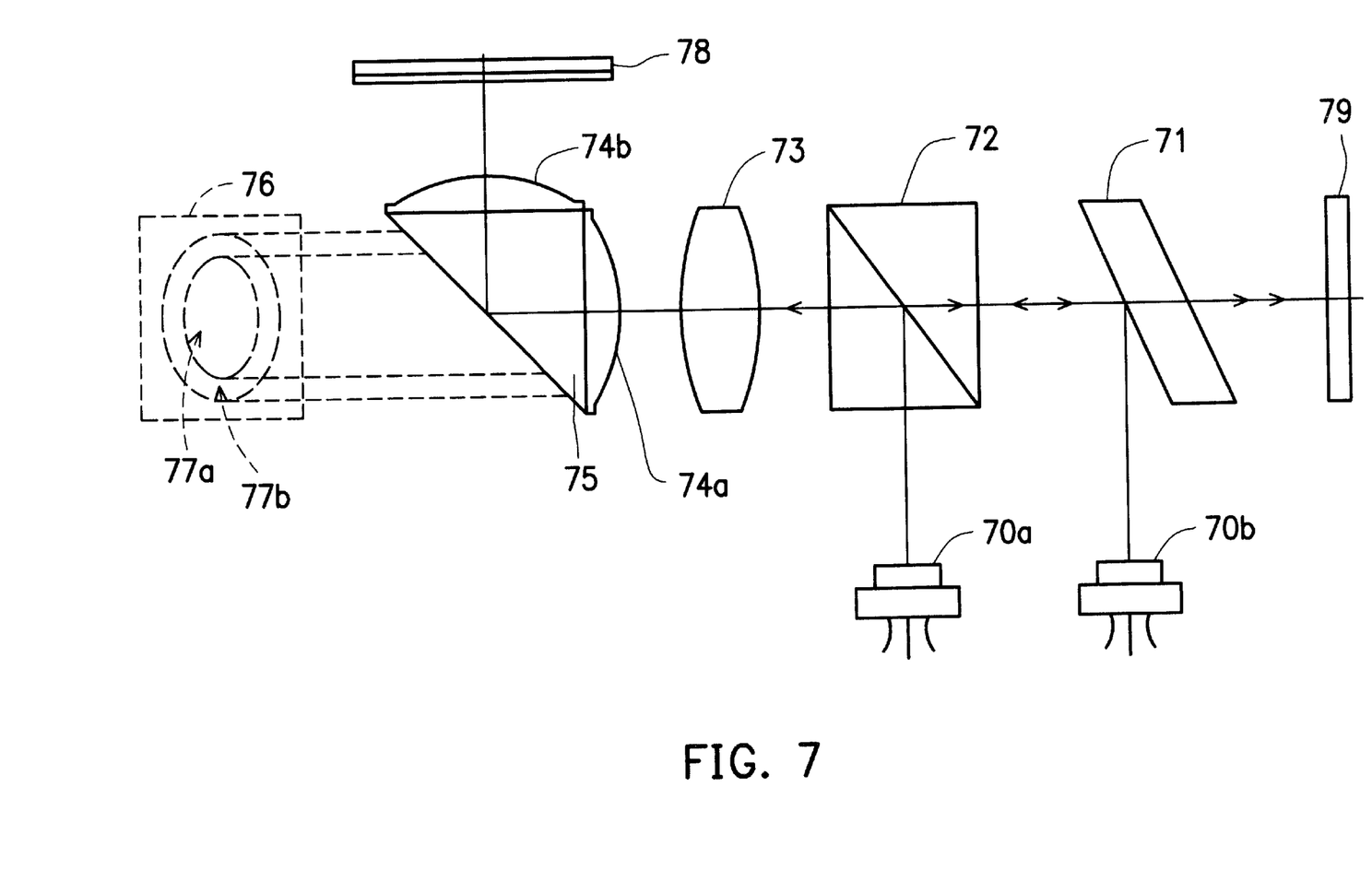
FIG. 7 is a schematic diagram showing a first example of a pickup head utilizing the prism-type objective lens of the invention.

FIG. 7 is a schematic diagram showing a first example of a pickup head, which is incorporated, with the prism-type objective lens of the invention. As shown, the pickup head includes a pair of laser diodes: a first laser diode 70a capable of generating a laser beam of 780 nm in wavelength, and a second laser diode 70b capable of generating a laser beam of 650 nm in wavelength, respectively used to read data from an optical disc 78 which can be either a CD or a DVD. Further, the pickup head includes a first board splitter 72, a second board splitter 71, a collimator 73, and a photo-detector pre-amp IC 79. The prism-type objective lens of the invention is installed between the collimator 73 and the optical disc 78, comprising a front aspherical plano-convex lens 74a, a prism 75, and a rear aspherical plano-convex lens 74b.

The pickup head is devised to read data from the optical disc 78 which can be either a CD or a DVD. In the case of the optical disc 78 being a CD, the first laser diode 70a is activated to generate a 780 nm laser beam which then propagates to the first board splitter 72, where the laser beam is reflected to the collimator 73. However, in the case of the optical disc 78 being a DVD, the second laser diode 70b is activated to generate the 650 nm which then propagates to the second board splitter 71 where the laser beam is reflected to the collimator 73.

In either case, the laser beam transmitted to the collimator 73 is collimated by the same. The collimated light from the collimator 73 then passes through the front aspherical piano-convex lens 74a into the prism 75, and subsequently propagates within the prism 75 until reaching the hypotenuse side 76 of the prism 75 (which has a cross section in the shape of a right triangle) where the laser beam is reflected sideways to the rear aspherical plano-convex lens 74b. Here the laser beam is focused onto the information surface of the optical disc 78.

In accordance with the invention, the exposed surface of the hypotenuse side 76 of the prism 75 is partitioned into two circular areas: an inner-aperture area 77a and an outer-aperture area 77b. The inner-aperture area 77a provides NA=0.43 and is coated with a reflective layer that can reflect a laser beam of a wavelength in the range of 650 nm to 780 nm, while the outer-aperture area 77b provides NA=0.6 and is coated with a reflective layer that can reflect a laser beam of a wavelength of 650 nm while allowing a laser beam of a wavelength of 650 nm to pass through it. Therefore, in the case of reading a CD where the 780 nm laser beam is used, the output of the prism-type objective lens of the invention will have NA=0.43, which is suited to read a 1.2 mm optical disc (i.e., a CD); whereas in the case of reading a DVD where the 650 nm laser beam is used, the output of the prism-type objective lens of the invention will have NA=0.6, which is suited to read a 0.6 mm optical disc (i.e., a DVD).

The output light from the prism-type objective lens of the invention is then focused on the information surface of the optical disc 78. The reflected light from the optical disc 78 then propagates in the reverse direction through the rear aspherical plano-convex lens 74b, the prism 75, the front aspherical plano-convex lens 74a, the collimator 73, the first board splitter 72, and the second board splitter 61 to the photo-detector pre-amp IC 79. In response to the reflected light, the photo-detector pre-amp IC 79 generates a number of opto-electrical signals that can be processed in a conventional method to obtain the data stored on the optical disc.

Second Example of A Pickup Head Utilizing the Invention

Figure 8:
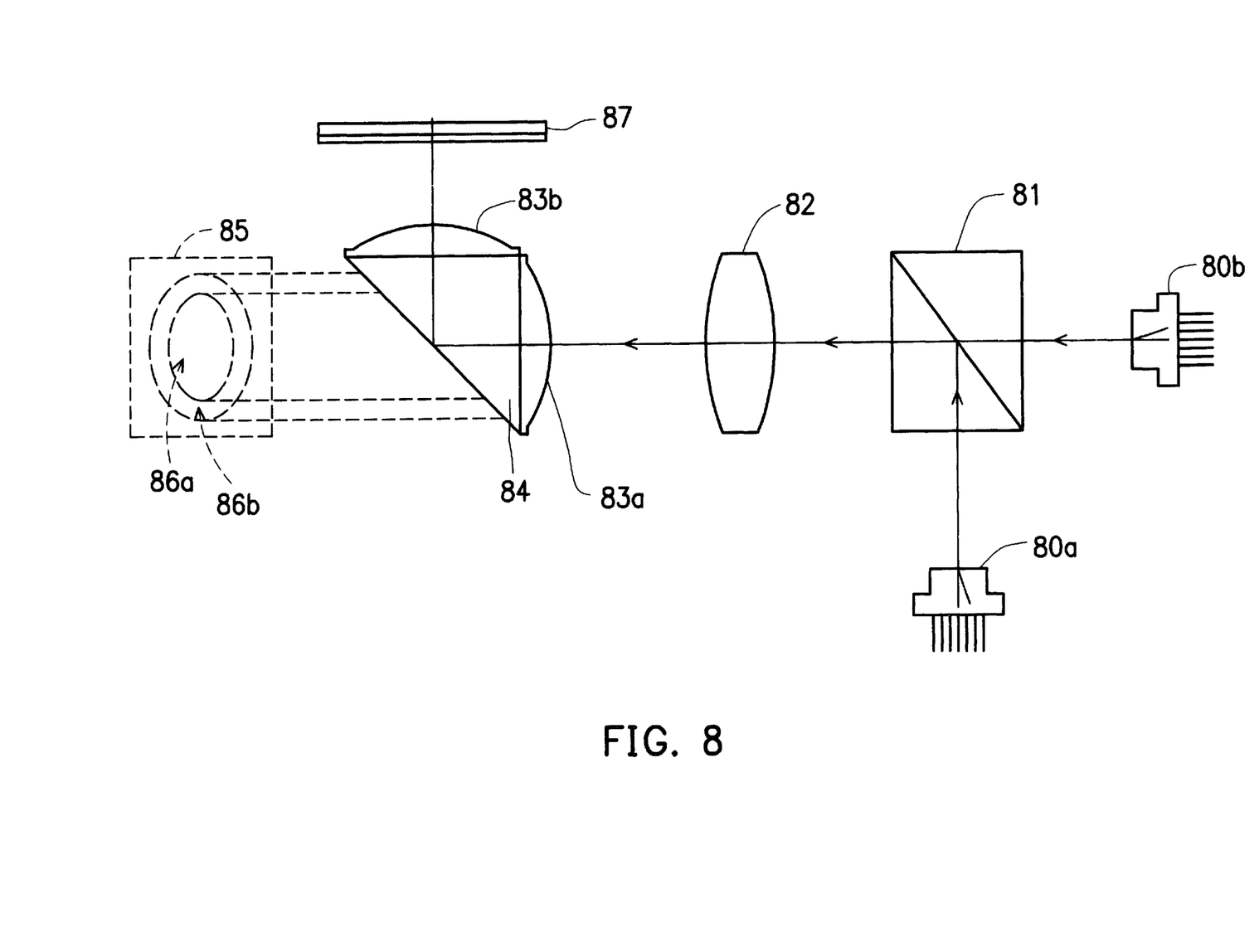
FIG. 8 is a schematic diagram showing a second example of a pickup head utilizing the prism-type objective lens of the invention.

FIG. 8 is a schematic diagram of a second example of a pickup head which is incorporated with the prism-type objective lens of the invention. As shown, the pickup head includes a pair of laser diodes: a first laser diode 80a capable of generating a laser beam of 780 nm in wavelength, and a second laser diode 80b capable of generating a laser beam of 650 nm in wavelength, respectively used to read data from an optical disc 87 which can be either a CD or a DVD. Further, the pickup head includes a dichotomic beam splitter 81 and a collimator 82. In this pickup head, the photo-detector means is built in the laser diodes 80a, 80b. The prism-type objective lens of the invention is installed between the collimator 82 and the optical disc 87, comprising a front aspherical plano-convex lens 83a, a prism 84, and a rear aspherical plano-convex lens 83b.

The pickup head is devised to read data from the optical disc 87 which can be either a CD or a DVD. In the case of the optical disc 87 being a CD, the first laser diode 70a is activated to generate a 780 nm laser beam which then propagates to the dichotomic beam splitter 81 where the laser beam is reflected to the collimator 82. In the in the case of the optical disc 87 being a DVD, the second laser diode 50*b* is activated to generate the 650 nm which then propagates to the dichotomic beam splitter 81, which allows the laser beam to transmit straight through it to the collimator 82.

In either case, the laser beam transmitted to the collimator 82 is collimated by the collimator 82. The collimated light from the collimator 82 then passes through the front aspherical plano-convex lens 83*a* into the prism 84, subsequently propagates within the prism 84 until reaching the hypotenuse side 85 of the prism 84 (which has a cross section in the shape of a right triangle). The hypotenuse side 85 then reflects the laser beam sideways to the rear aspherical plano-convex lens 83*b* which then focuses the laser beam onto the information surface of the optical disc 87.

In accordance with the invention, the exposed surface of the hypotenuse side 85 of the prism 84 is partitioned into two circular areas: an inner-aperture area 83*a* and an outer-aperture area 83*b*. The inner-aperture area 83*a* provides NA=0.43 and is coated with a reflective layer that can reflect a laser beam of a wavelength in the range of 650 nm to 780 nm. The outer-aperture area 83*b* provides NA=0.6 and is coated with a reflective layer that can reflect a laser beam of a wavelength of 650 nm while allowing a laser beam of a wavelength of 650 nm to pass through. Therefore, in the case of reading a CD where the 650 nm laser beam is used, the output of the prism-type objective lens of the invention will have NA=0.43, which is suited to read a 0.6 mm optical disc (i.e., a CD). However, in the case of reading a DVD where the 650 nm laser beam is used, the output of the prism-type objective lens of the invention will have NA=0.6, which is suited to read a 0.6 mm optical disc (i.e., a DVD).

The output light from the prism-type objective lens of the invention is then focused on the information surface of the optical disc 87. The reflected light from the optical disc 87 then propagates in the reverse direction through the rear aspherical plano-convex lens 83*b*, the prism 84, the front aspherical plano-convex lens 83*a*, the collimator 82, and the dichotomic beam splitter 81 back to the first laser diode 80*a* or the second laser diode 80*b*. In response to the reflected light, the built-in photo-detector of either the first laser diode 80*a* or the second laser diode 80*b* generates a number of opto-electrical signals that can be processed in a conventional method to obtain the data stored on the optical disc.

Third Example of A Pickup Head Utilizing the Invention

Figure 9:
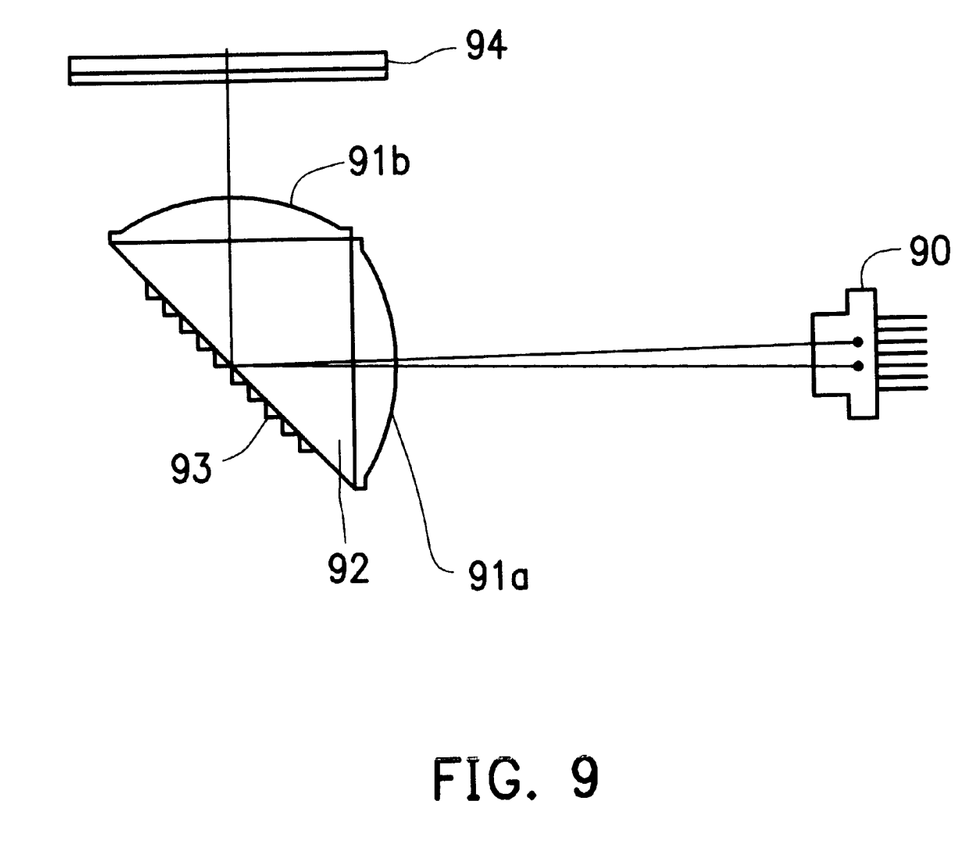
FIG. 9 is a schematic diagram showing a third example of a pickup head utilizing the prism-type objective lens of the invention.

FIG. 9 is a schematic diagram showing a third example of a pickup head, which is incorporated, with the prism-type objective lens of the invention. As shown, this pickup head includes a single laser diode 90 which is of the type having a built-in HOE (not shown) and a built-in photo-detector (not shown). In this pickup head, the prism-type objective lens of the invention is installed between the laser diode 90 and the optical disc 94, comprising a front aspherical plano-convex lens 91*a*, a prism 92, a rear aspherical plano-convex lens 91*b*, and additionally a reflective HOE layer 93 provided on the hypotenuse side of the prism 92.

In operation, the laser diode 90 generates a laser beam which is directly transmitted to the prism-type objective lens of the invention. The laser beam is first focused by the front aspherical plano-convex lens 91 *a* onto the hypotenuse side of the prism 92, and then reflected by the reflective HOE layer 93 to the rear aspherical piano-convex lens 91*b* which then focuses the laser beam onto the information surface of the optical disc 94. The reflective HOE layer 93 allows the laser beam incident on it and reflected from it to be diffracted into two beams which are focused at different points for the purpose of reading data from two different types of optical discs.

The reflected light from the optical disc 94 then propagates in the reverse direction through the rear aspherical plano-convex lens 91*b*, the prism 92, the reflective HOE layer 93, and the front aspherical piano-convex lens 91*a* back to the laser diode 90. In response to the reflected light, the built-in photo-detector of the laser diode 90 generates a number of opto-electrical signals that can be processed to obtain the data stored on the optical disc 94.

As a summary, the prism-type objective lens of the invention comprises three essential parts: a prism having a cross section substantially in the shape of a right triangle, a front aspherical plano-convex lens having a planar side attached to a first side other than the hypotenuse side of the prism, and a rear aspherical piano-convex lens having a planar side attached to a second side other than the hypotenuse side of the prism. These three parts can be made either from the same optical material or from different ones. Moreover, these three parts can be separately formed and then attached together to form the prism-type objective lens, or alternatively can be integrally formed.

It can be seen from FIGS. 7 through 9 that those pickup heads that utilize the prism-type objective lens of the invention have a reduced number of separate optical components when compared to the prior art. Those pickup heads can thus be made more compact in size than those of the prior art.

Assume the planar side of the aspherical plano-convex lens is on the X-Y plane; then, as a general rule, an aspherical lens surface can be expressed in terms of the Z coordinate by the following equation:

$$Z = \frac{ch^2}{1+\sqrt{1-(1+k)\cdot c^2 \cdot h^2}} + Ah^4 + Bh^6 +$$

$$Ch^8 + Dh^{10} + Eh^{12} + Fh^{14} + Gh^{16} + Hh^{18} + Jh^{20}$$

where c is the curvature of the aspherical surface;

r is the radius of curvature of the aspherical surface, where r=1/c;

k is the conic coefficient of the aspherical surface, where
  if k=0, the lens surface is a spherical surface (non-aspherical);
  if −1<k<0, the lens surface is an ellipsoidal surface (aspherical);
  if k=−1, the lens surface is a parabolic surface (aspherical); and
  if k<−1, the lens surface is a hyperbolic surface (aspherical);

A, B, C, D, E, F, H, G, H, J are respectively the 4th order, 6th order, 8th order, 10th order, 12th order, 14th order, 16th order, 18th order, and 20th order of deformation coefficients; and $h=(X^2+Y^2)^{1/2}$, where X, Y are the X, Y coordinates of each point Z on the lens surface.

Assume the front aspherical plano-convex lens (i.e., 74*a* in FIG. 7, 83*a* in FIG. 8, and 91*a* in FIG. 9) has a focal length $f_1$ and a radius of curvature $r_1$, and the rear aspherical plano-convex lens (i.e., 74*b* in FIG. 7, 83*b* in FIG. 8, and 91*b* in FIG. 9) has a focal length $f_2$ and a radius of curvature $r_2$. It can be seen that the prism-type objective lens of the invention is even easier to manufacture provided that $f_1$, $f_2$, $r_1$, and $r_2$ satisfy the following relationships:

(1) $f_1 > f_2$ (2) $0.6 < r_2/r_1 < 0.2$

The foregoing two specifications in focal length and radius of curvature can make the convex surface (i.e., the aspherical surface) of both the front and rear aspherical plano-convex lenses to be formed with a large radius of curvature, which makes the aspherical surfaces of the front and rear aspherical plano-convex lenses easy to shape during their manufacture. However, these specifications are not intended to restrict the scope of the invention. Other specifications are still within the scope of the invention, except that they might cause the prism-type objective lens to be more difficult to shape in its manufacture.

In conclusion, the invention is characterized in that the combination of a prism, a front aspherical plano-convex lens, and a rear aspherical plano-convex lens into a single component allows the pickup head utilizing the invention to be made more compact in size.

Moreover, the invention is characterized in that the coatings on the hypotenuse side of the prism allow the pickup head utilizing the invention to be able to read data from two types of optical discs such as a CD and a DVD.

The invention has been described using exemplary preferred embodiments. However, it is to be understood that the scope of the invention is not limited to the disclosed embodiments. To the contrary, it is intended to cover various modifications and similar arrangements. The scope of the claims, therefore, should be accorded the broadest interpretation so as to encompass all such modifications and similar arrangements.

What is claimed is:

1. A prism-type objective lens for use in the pickup head of an optical disc drive, which comprises:
   a prism having a cross section substantially in the shape of a right triangle;
   a front aspherical plano-convex lens having a planar side attached to a first side other than the hypotenuse side of said prism;
   a rear aspherical plano-convex lens having a planar side attached to a second side other than the hypotenuse side of said prism; and
   an optical layer attached to the hypotenuse side of said prism which allows an incident laser beam to focus at different points for driving different types of optical discs.

2. The prism-type objective lens of claim 1, wherein said front aspherical plano-convex lens is larger in focal length than said rear aspherical plano-convex lens.

3. The prism-type objective lens of claim 1, wherein the ratio of the radius of curvature of the convex side of said rear aspherical plano-convex lens to the radius of curvature of the convex side of said front aspherical plano-convex lens is set in the range of 0.2 to 0.6.

4. The prism-type objective lens of claim 1, wherein the hypotenuse side of said prism is formed with an inner-aperture area where an inner reflective layer is coated and an outer-aperture area surrounding said inner-aperture area where an outer reflective layer is coated.

5. The prism-type objective lens of claim 4, wherein said inner reflective layer is formed in such a manner so as to reflect a first laser beam of 650 nm in wavelength, and said outer reflective layer is formed in such a manner so as to reflect a second laser beam of from 650 nm to 780 nm in wavelength.

6. The prism-type objective lens of claim 1, wherein the optical layer attached to the hypotenuse side of said prism is formed with a reflective holographic optical element (HOE) layer.

7. The prism-type objective lens of claim 1, wherein said prism, said front aspherical plano-convex lens, and said rear aspherical plano-convex lens are respectively made from different optical materials.

8. The prism-type objective lens of claim 1, wherein said prism, said front aspherical plano-convex lens, and said rear aspherical plano-convex lens are made from the same optical material.

9. The prism-type objective lens of claim 8, wherein said prism, said front aspherical plano-convex lens, and said rear aspherical plano-convex lens are integrally formed.

10. The prism-type objective lens of claim 1, wherein said prism, said front aspherical plano-convex lens, and said rear aspherical plano-convex lens are integrally formed.

11. A prism-type objective lens for use in the pickup head of an optical disc drive, which comprises:
    a prism having a cross section substantially in the shape of a right triangle, said prism having a hypotenuse side formed with a reflective holographic optical element (HOE) layer;
    said (HOE) layer attached to the hypotenuse side of said prism which allows an incident laser beam to focus at different points for driving different types of optical discs;
    a front aspherical plano=convex lens having a planar side attached to a first side other than the hypotenuse side of said prism; and
    a rear aspherical plano-convex lens having a planar side attached to a second side other than the hypotenuse side of said prism.

12. The prism-type objective lens of claim 11, wherein said front aspherical plano-convex lens is larger in focal length than said rear aspherical plano-convex lens.

13. The prism-type objective lens of claim 11, wherein the ratio of the radius of curvature of the convex side of said rear aspherical plano-convex lens to the radius of curvature of the convex side of said front aspherical plano-convex lens is set in the range of 0.2 to 0.6.

14. The prism-type objective lens of claim 11, wherein said prism, said front aspherical plano-convex lens, and said rear aspherical plano-convex lens are respectively made from different optical materials.

15. The prism-type objective lens of claim 11, wherein said prism, said front aspherical plano-convex lens, and said rear aspherical plano-convex lens are made from the same optical material.

* * * * *